Patented Dec. 25, 1951

2,579,483

UNITED STATES PATENT OFFICE 2,579,483

ADHESIVE COMPOSITION

James E. Fenn, Baldwin, N. Y., assignor of one-tenth to Charles H. Brown, Princeton, N. J.

No Drawing. Application July 29, 1949,
Serial No. 107,629

9 Claims. (Cl. 260—17.5)

This invention relates to improvements in adhesive materials and to the process of making the same.

In my U. S. Patent 2,457,357 I have disclosed a novel type of adhesive suitable for gummed tape and gummed paper made by treating the concentrated waste liquor of the sulfite process of pulp manufacture, consisting mainly of salts of ligno-sulfonic acid (known by the trade-name Lignone) with a small amount of phosphoric acid. Briefly, the process disclosed in my patent generally involves adding an amount of phosphoric acid ranging from 0.5 to 3% (equivalent to 75% concentration $H_3PO_4$) to the Lignone, on the liquid basis, agitating at room temperature, then heating the resulting product to 175°–207° F. while continuing the agitation, cooling to room temperature while still stirring the product, and adding polyvinyl alcohol. Reference is made to this patent for a more detailed description of the details of the process. A practical difficulty experienced with this new adhesive when used as a remoistening adhesive for gummed paper, is the tendency of the tape to block when subjected to high atmospheric humidity for relatively long periods. The term "block" is herein used to designate the characteristic of the remoistening adhesive to adhere to the ungummed back of the tape when it is rolled up. The reason for this blocking is that the adhesive is somewhat hygroscopic, will absorb moisture from the atmosphere and become tacky to the point where it cannot be separated from the ungummed surface when wound in a customary roll without pulling paper fibers from the ungummed surface, or even may become tacky to the point where the roll of tape cannot be unwound.

I have been successful in improving the resistance to blocking of my phosphoric acid-treated lignone adhesive, combined with polyvinyl alcohol, when used on gummed tape, by adding a relatively high percentage of urea or thiourea as the main plasticizer in the adhesive. This urea or thiourea may be added after the lignone has been acid and heat treated, and before or after the addition of polyvinyl alcohol. The quantity of urea or thiourea which has been found to be effective may be as large as 20%, although 15% will produce highly desirable results. This large quantity of urea or thiourea used in my improved adhesive will be surprisingly large to anyone skilled in the gummed tape and adhesive industry because 20% of urea will render animal-glue liquid (i. e., if the glue is dissolved with this quantity of urea it will remain liquid indefinitely after it cools down instead of becoming a stiff gel). Urea and glycerine or glycol, or invert sugar can be used to good advantage in the adhesive of the invention in the proportions of 10% to 15% of urea or thiourea to 10% to 5% of the glycerine, glycol or invert sugar. Part of the urea may be replaced by any one or a combination of salts customarily used in the gummed tape industry, provided that the amount of urea or thiourea is at least of the order of 10% and preferably 15% based on the dry weight of the total adhesive composition (viz., without water).

I have also found that the use of a slight quantity of a compound which when mixed with water releases sulfur dioxide or sulfurous acid exerts a beneficial effect on the acid-treated lignone adhesive, and the acid-treated lignone blended with polyvinyl alcohol and urea or thiourea when used as a remoistening adhesive on gummed tape. Examples of such compounds are: sodium bisulfite, zinc hydrosulfite and sulfur dioxide gas. The slight quantity of compound (for example, 1% of zinc hydrosulfite based on the dry weight of the lignone) may be applied to the lignone in the process of manufacture before or after the phosphoric acid is added to the lignone and before the material is heated, and has the tendency to keep the resultant adhesive coated tape "alive" for long periods of time. Stated otherwise, the slight amount of compound enables the tape to retain all of its good qualities for months, without losing its "quick-tack" properties to any appreciable extent.

In working with different grades of polyvinyl alcohol (PVA) of medium saponification number (86% to 91%) I have found that the lower viscosity PVA in the composition of treated Lignone and urea or thiourea, although satisfactory at normal relative humidities of approximately 50% exhibited a greater tendency to block at higher relative humidities than the medium viscosity or medium degree of polymerization grade of PVA, and that the high viscosity or high degree of polymerization grade of PVA showed more resistance towards blocking or absorbing moisture from the surrounding atmosphere. However, the high viscosity of PVA, when made into the proper adhesive composition for gummed tape, exhibited such high viscosity in the final composition that considerably more water had to be used compared to the lower viscosity PVA in order to obtain a solution which will work, that is, will spread and coat properly on the gumming machines without objectionable foaming on the coating machine.

This foaming is due to the high surface tension of the adhesive composition which is being continuously churned in the glue-pan by the revolving pick-up roll and this churning beats air into the composition which air is subdivided into smaller and smaller bubbles by the shearing action of the pick-up and coating rolls. If the surface tension of the adhesive composition is low, most of the large bubbles will burst and foaming will be negligible. However, if the surface tension of the composition is high, the air bubbles do not burst readily and, on running the coating machine, they will build up to the point where the adhesive composition will have the consistency or taffy or marshmallow. At this point, the adhesive will not coat properly because the adhesive does not spread smoothly and produce a continuous film, as a result of which the machine has to be stopped, the glue-pan cleaned out and the machine started with fresh adhesive solution.

Using more water in the adhesive composition to reduce its surface tension will eliminate this trouble of foaming but in this case a heavier film of adhesive has to be applied to the paper in order to obtain the necessary solids needed for the proper performance of the gummed tape. The addition of more water to the adhesive composition means that this additional water has to be evaporated in the drying process on the machine as a result of which the speed of operation of the machine is necessarily lowered with a consequent lowering in the rate of production, thereby increasing the cost of the finished tape materially.

The addition of any of the known surface tension reducing agents to the adhesive composition does not work out satisfactorily because these known agents have the tendency to remain in the adhesive film, thus making the adhesive film tacky and very susceptible to blocking. These known agents either have a higher boiling point than water and are not evaporated from the adhesive composition during the drying process, or combine with the other ingredients of the adhesive and give the same blocking effects.

I have found, however, that the addition of small amounts of formamide to the composition consisting of phosporic acid-treated lignone, urea (or thiourea) and polyvinyl alcohol (PVA), will reduce the viscosity and surface tension of the composition to such marked degree that it enables the use of the high viscosity grade of PVA in the concentration necessary to obtain a properly working tape without the necessity for having to add excessive quantities of water to the composition in order to make it run free of trouble on the coating machines. The advantageous effect is not limited to the use of high viscosity grade of PVA, although this is preferred, since if desired, medium and low viscosity grade PVA may also be used with beneficial results. The quantity of formamide necessary to obtain these results is in the range of approximately 2%–6% based on the solids of the adhesive composition, preferably 3% to give best results.

Other amides and amide derivatives have been tried, and are not as satisfactory as formamide in the practice of the invention. Formamide used by itself without urea or thiourea, in the process of manufacture of my phosphoric acid-treated lignone, will reduce the viscosity of the composition but the resulting tape lacks the plasticizer, urea, and will not perform properly. Mixtures of formamide and acetamide or other amide derivatives will give approximately the same disadvantageous results; i. e., the tape does not perfrom properly. Mixes of acetamide, ethanolformamide and ethanol-acetamide with urea work to a degree but not as well as the blend of urea and formamide. Larger quantities of formamide without urea will reduce the viscosity of the composition and will act as plasticizer to some degree but because formamide has a boiling point of about 210° C., the formamide is not evaporated to any great degree from the composition during the drying process of the tape and remains in the final adhesive composition. Because formamide is a liquid, when it is used in larger quantities it makes the adhesive too tacky and the tape will block when wound up in a roll. The combination of formamide and urea does something that neither one does by itself, nor the combination of any other amide or amide derivative does to such degree as the combination of the two: viz., formamide and urea.

The addition of formamide to the acid-treated lignone must be made subsequent to the acid and heat treat.nent of the lignone, and can be made at any point in the subsequent process of manufacture without affecting deleteriously the final composition; thus, the formamide can be added to the polyvinyl alcohol (PVA), or at any other intermediate point of the process of compounding the final adhesive composition.

The remoistening adhesive of the invention using phosphoric acid-treated lignone, blended with urea, polyvinyl alcohol and formamide in the desired percentages has been found to withstand relative humidities as high as 98% at room temperatures of approximately 70° F. to 75° F. This adhesive has the additional desirable characteristics of being a substitute for and less expensive to manufacture than a glue adhesive for use on gummed tape.

The following example is given for the purpose of illustrating the quantities of the ingredients which may be used in the remoistening adhesive of the invention, but these quantities are not to be considered as limitations:

|  | Pounds |
|---|---|
| Solid lignone (63.7% of total) | 254.8 |
| $H_3PO_4$ (100% concentration) (.65 of total) | 2.6 |
| Zinc hydrosulfite (.65 of total) | 2.6 |
| Urea (20% of total) | 80.0 |
| Formamide (3% of total) | 12.0 |
| Polyvinyl alcohol (PVA) (12% of total) | 48.0 |
| Adhesive composition (without water)—total | 400.0 |

In the foregoing example, all of the ingredients mentioned are calculated on the dry basis. In order to make a workable solution for use on the coating machines, and as a practical matter, the lignone is dissolved in water (for 254.8 lbs. of solid lignone there is added 208 lbs. of water) prior to the addition of the phosphoric acid and the zinc hydrosulfite. Similarly, the polyvinyl alcohol is also dissolved in water (for 48 lbs. of PVA there is added 192 lbs. of water) prior to adding to this solution to the acid-treated lignone. It will thus be seen that the entire composition will consist of approximately 50% active ingredients and 50% water, making a total of about 800 lbs. for use on the coating machine.

A short summary of the process of manufacture of the adhesive of my invention will now be given:

The concentrated waste liquor of the sulfate pulp process is treated with a small quantity of phosphoric acid ($H_3PO_4$), as described in my patent supra, adding either before or after the phosphoric acid is added a slight quantity (for example, 1%) of a compound which when mixed with water releases sulfur dioxide or sulfurous acid, while stirring the mixture, heating the mixture of lignone, phosphoric acid and this compound to a temperature of 175° F.–207° F. while stirring, then stopping the heating, (at this stage the conversion of the concentrated waste liquor of the sulfite pulp process to adhesive is completed), and adding formamide and relatively large amounts (15–20%) of urea or thiourea in any order while continuing the agitation, and finally adding 5% to 25% polyvinyl alcohol during stirring of the mixture. The polyvinyl alcohol may be added before or after the formamide or urea (or thiourea), although as a practical matter, it is preferred that the polyvinyl alcohol be added after the formamide, otherwise the solution would be unnecessarily highly viscous before formamide is added. If desired, the conversion product can first be cooled before the formamide and polyvinyl alcohol are added.

Because the chemical formula of lignone (the concentrated waste liquor of the sulfite pulp process) is unknown by those skilled in the chemical art, I cannot advance any theory to account for the highly desirable but unexpected results obtained by the use of the urea and thiourea plasticizer or the sulfur dioxide releasing compound or the formamide on this acid-treated material, in accordance with the teachings of the invention. The results, however, are unexpected and contrary to what might be expected by those using plasticizers and sulfur dioxide releasing compounds in the gummed tape industry in which animal glue adhesives are used.

What is claimed is:

1. An adhesive comprising as a major ingredient the concentrated waste liquor of the sulfite pulp process, polyvinyl alcohol, a plasticizer selected from the group consisting of urea and thiourea, and formamide, said plasticizer and formamide together being in an amount not less than the amount of polyvinyl alcohol.

2. An adhesive comprising as a major ingredient the concentrated waste liquor of the sulfite pulp process, polyvinyl alcohol, a compound capable of releasing sulphur dioxide when mixed with water, a plasticizer selected from the group consisting of urea and thiourea, and formamide, said plasticizer and formamide together being in an amount not less than the amount of said polyvinyl alcohol.

3. An adhesive composition comprising as a major ingredient the concentrated waste liquor of the sulfite process, 5% to 25% of polyvinyl alcohol, 10% to 20% of a plasticizer selected from the group consisting of urea and thiourea, and 2% to 6% of formamide, said percentages being based on the dry weight of the adhesive composition.

4. An adhesive composition comprising as a major ingredient the concentrated waste liquor of the sulfite pulp process, 1% to 6% of phosphoric acide calculated on the dry basis of the liquor, 5% to 25% of polyvinyl alcohol, 10% to 25% of a plasticizer selected from the group consisting of urea and thiourea, approximately 1% of zinc hydrosulfide based on the dry weight of the liquor, and approximately 2% to 6% of formamide.

5. An adhesive composition comprising a mixture whose major ingredient is the reaction product of the concentrated waste liquor of the sulfite pulp process and phosphoric acid equivalent to 0.5% to 3% $H_3PO_4$ of 75% concentration based on the liquid basis of the liquor, blended with polyvinyl alcohol in an amount of 5% to 25%, and a plasticizer selected from the group which consists of urea and thiourea in an amount of substantially 10% to 20%, and approximately 2% to 6% of formamide, said polyvinyl alcohol, plasticizer and formamide being based on the dry weight of the adhesive composition.

6. A remoistening type of adhesive comprising as a major ingredient the concentrated waste liquor of the sulfite pulp process, polyvinyl alcohol, and blocking inhibitors comprised of approximately 10% to 20% of a plasticizer selected from the group consisting of urea and thiourea, and approximately 2% to 6% of formamide, said percentages being on a dry basis.

7. An adhesive composition comprising as a major ingredient the concentrated waste liquor of the sulfite pulp process, 1% to 6% of phosphoric acid calculated on the dry basis of the liquor, 5% to 25% of polyvinyl alcohol, 10% to 25% of a plasticizer selected from the group consisting of urea and thiourea, approximately 1% of a compound capable of releasing sulfur dioxide when mixed with water, based on the dry weight of the liquor, and approximately 2% to 6% of formamide.

8. An adhesive comprising as a major ingredient the concentrated waste liquor of the sulfite pulp process, 5% to 25% of polyvinyl alcohol, 10% to 20% of a plasticizer selected from the group consisting of urea and thiourea, and approximately 2% to 6% of formamide, the amount of said formamide used in said adhesive being less than that of said polyvinyl alcohol, both amounts being calculated on the dry basis, said plasticizer being in an amount greater than said polyvinyl alcohol.

9. The process of making a remoistening adhesive which comprises adding to the concentrated waste liquor of the sulfite pulp process a quantity of approximately 0.5 to 3% phosphoric acid of 75% concentration on the liquid basis and a quantity of a substance which will release sulfur dioxide when mixed with water, stirring and heating the mixture, the amount of sulfur dioxide used being equivalent to that released by approximately 1% of zinc hydrosulfite, and subsequently adding a plasticizer selected from the group consisting of urea and thiourea, adding formamide and polyvinyl alcohol, wherein the concentrated waste liquor is the major ingredient, and the urea and formamide together constitute an amount greater than the polyvinyl alcohol.

JAMES E. FENN.

REFERENCES CITED

The following references are of record in the file of this patent:

UNITED STATES PATENTS

| Number | Name | Date |
|---|---|---|
| 2,148,893 | Bauer | Feb. 28, 1939 |
| 2,162,618 | Izard | June 13, 1939 |
| 2,340,866 | Dangelmajer | Feb. 8, 1944 |
| 2,385,586 | Rudy | Sept. 25, 1945 |
| 2,443,889 | Bruce | June 22, 1948 |
| 2,457,357 | Fenn | Dec. 28, 1948 |